(12) United States Patent
Jeong

(10) Patent No.: US 6,183,700 B1
(45) Date of Patent: Feb. 6, 2001

(54) FUEL ACTIVATION APPARATUS USING MAGNETIC BODY

(76) Inventor: Tae Young Jeong, 508, Mabuk-ri, Kusung-myon, Yongin-city, Kyunggi-do (KR)

( * ) Notice: Under 35 U.S.C. 154(b), the term of this patent shall be extended for 0 days.

(21) Appl. No.: 09/291,003

(22) Filed: Apr. 14, 1999

(30) Foreign Application Priority Data

Apr. 14, 1998 (KR) .................................................. 98-13318
Apr. 9, 1999 (KR) .................................................. 99-12536

(51) Int. Cl.$^7$ ...................................................... B01J 19/08
(52) U.S. Cl. ...................................... 422/186.01; 123/538
(58) Field of Search ........................ 422/186.01; 123/538

(56) References Cited

U.S. PATENT DOCUMENTS

| | | | | |
|---|---|---|---|---|
| 3,830,621 | * | 8/1974 | Miller | 431/356 |
| 4,188,296 | * | 2/1980 | Fujita | 210/222 |
| 4,568,901 | | 2/1986 | Adam . | |
| 4,569,737 | * | 2/1986 | Sakata | 585/899 |
| 4,716,024 | * | 12/1987 | Pera | 422/186.01 |
| 4,933,151 | * | 6/1990 | Song | 422/186.01 |
| 5,329,911 | * | 7/1994 | Jeong | 123/538 |
| 5,671,719 | * | 9/1997 | Jeong | 123/538 |
| 5,882,514 | * | 3/1999 | Fletcher | 422/186.01 |

FOREIGN PATENT DOCUMENTS 105638   7/1996   (KR) .

* cited by examiner

*Primary Examiner*—Kathryn Gorgos
*Assistant Examiner*—Thao Tran
(74) *Attorney, Agent, or Firm*—Fitzpatirck, Cella, Harper & Scinto

(57) ABSTRACT

Disclosed is a fuel activation apparatus using a magnetic force of a magnetic body. The apparatus comprises a hollow cylindrical body, including an inlet through which fuels flow into and an outlet through which the fuels flow out, for forming a predetermined fuel flow space, a magnetic body, including a fuel path allowing the fuels to pass along the center axis of the body, a pair of diaphragms which are disposed at spaces formed between front and rear sides of the magnetic body and an inner circumferential surface of the body, for regulating the flow of the fuels, and fuel guide members which are placed inside the fuel path of the magnetic body, for allowing the fuels to flow in a vortex form, and fuel induction members which are placed at both sides of the magnetic body, for inducing uniform ionization of the fuels. The apparatus provides effects that a flowing speed of the fuels is properly regulated in a magnetic field, and the ionization of the fuels is maximized to obtain uniform minute particles.

6 Claims, 5 Drawing Sheets

FUEL ACTIVATION APPARATUS USING MAGNETIC BODY

BACKGROUND OF THE INVENTION

1. Field of the Invention

The present invention relates to a fuel activation apparatus using a magnetic body, and more particularly, to a fuel activation apparatus using a magnetic body which can maximize ionization of particles of a fuel under the influence of a magnetic force in a magnetic field, including diaphragms respectively disposed at an inlet and an outlet through which the fuels pass, and a magnetic induction member, by which the flow-in and flow-out speed of fuels which rotate and flow quickly in an inner side thereof is controlled, and the fuels are passed through the magnetic field in a reduced speed.

2. Description of Related Art

Generally, a liquid or gas fuel used for an internal combustion engine is composed of a set of molecules. Positive (+) and negative (−) electric charges exist in the fuel's molecules. Due to attraction between the positive (+) and negative (−) electric charges, the fuel particles of the negative and positive electric charges are not splitted into more minute particles. Accordingly, the fuels are not actively interlocked with oxygen during combustion, thereby causing incomplete combustion.

To improve the incomplete combustion of the fuels, there has been technique that the ionization of the fuel particles is accomplished by the supply of magnetic force from a magnetic body.

Typical examples of the prior art are in detail disclosed in U.S. Pat. No. 4,568,901 and 4,933,151.

Fuel ionization apparatuses in the prior art disclose that a plurality of magnets enclose a fuel duct, or the fuels are made to flow through small holes perforated on the central portion of magnets. Particularly, the former allows a large amount of magnetic forces to be applied to the fuel by which a plurality of magnets are disposed outside a fuel duct having the inner diameter slightly larger than the inner diameter of a fuel hose. However, this case has a drawback that better ionization of the fuel is not accomplished due to limitation of time and space for ionization as well as too much magnetic forces applied to the fuels.

The latter arranges a plurality holes on the central portion of a large-sized magnet, through which the fuels flow. This latter reduces combustion efficiency because the supply of too much magnetic forces and over ionization of the fuels are caused, compared with the time and space that the fuels pass.

There have been drawbacks in the well-known art not to properly utilize magnetic forces generated from the magnetic body, and also to reduce fuel combustion efficiency due to too much magnetic forces being directly applied to the fuel and over-ionization of the fuel.

Further effective ionization technique of fuels using a magnetic body has been disclosed in Korean patent no. 105638 by the inventor of the present invention that allows the fuels to effectively pass through the magnetic body.

SUMMARY OF THE INVENTION

Therefore, to solve the above problems, it is an object of the present invention to provide a fuel activation apparatus using a magnetic body which can maximize ionization of particles of fuels by regulating a magnetic force of the magnetic body and a passage speed of the fuels, in which the fuels rotatably flow in a reduced speed along a fuel flow path in a vortex fashion under the influence of the magnetic force being directly applied from the magnetic body to the fuels.

Another object of the present invention is to provide a magnetic force adjustment structure having a multi-layered shape which enables the magnetic force induced from magnets placed on the central portion of a magnetic body to affect both sides of the magnetic body.

To accomplish the above objects of the present invention, there is provided a fuel activation apparatus using a magnetic force of a magnetic body, comprising: a hollow cylindrical body, including an inlet through which fuels flow into and an outlet through which the fuels flow out, for forming a predetermined fuel flow space; a magnetic body, including a fuel path allowing the fuels to pass along the center axis of the body; a pair of diaphragms, disposed at spaces formed between front and rear sides of the magnetic body and an inner circumferential surface of the body, for regulating the flow of the fuels; and fuel guide members, placed inside the fuel path of the magnetic body, for allowing the fuels to flow in a vortex form; and fuel induction members, placed at both sides of the magnetic body, for inducing uniform ionization of the fuels.

The diaphragms which are disposed at the front and rear portions of the magnetic body, include predetermined fixed portions so that the fuel path is formed at an inner circumferential surface of the body. Here, various ways for forming the fuel path can be provided.

It is preferable that magnetic force adjustment members and shielding members of the magnetic body are arranged in a multi-layered form so that the magnetic force is induced radially centering around the fuel path, and simultaneously the force is affected to the front and rear directions thereof, considering a predetermined interval therebetween, induction degree, materials, etc.

The apparatus of the present invention comprises magnetic induction members which are installed with sequently and vertically multi-layered connection so that the flowing speed of the fuels is properly regulated and the magnetic force is induced in the range of the magnetic force of the magnetic body being emitted laterally.

BRIEF DESCRIPTION OF THE DRAWINGS

Preferred embodiments are described with reference to the drawings wherein.

DETAILED DESCRIPTION OF THE PREFERRED EMBODIMENT

A preferred embodiment of the present invention will be described below in more detail with reference to the accompanying drawings.

Figure 1:
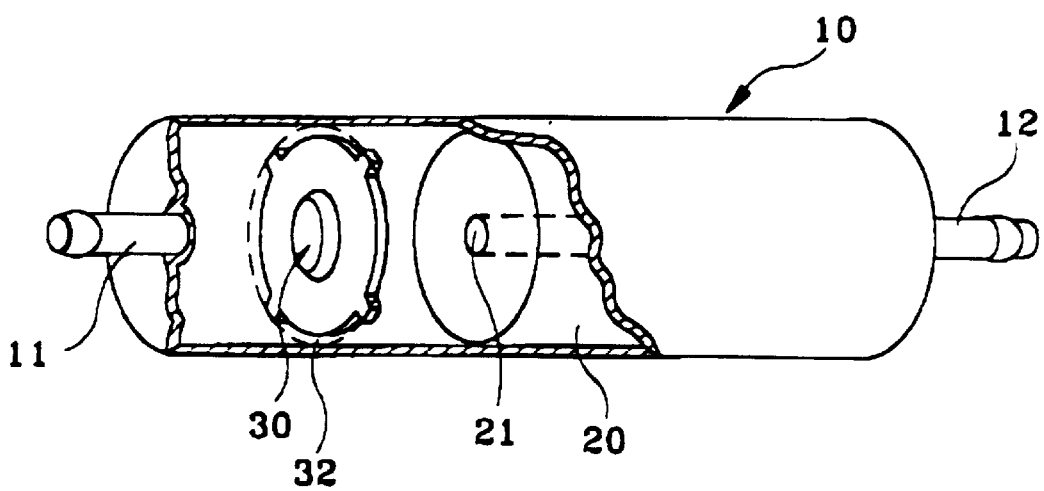
FIG. 1 is a perspective view showing a partly cut-section of a fuel activation apparatus using a magnetic body according to one embodiment of the present invention.
Figure 2:
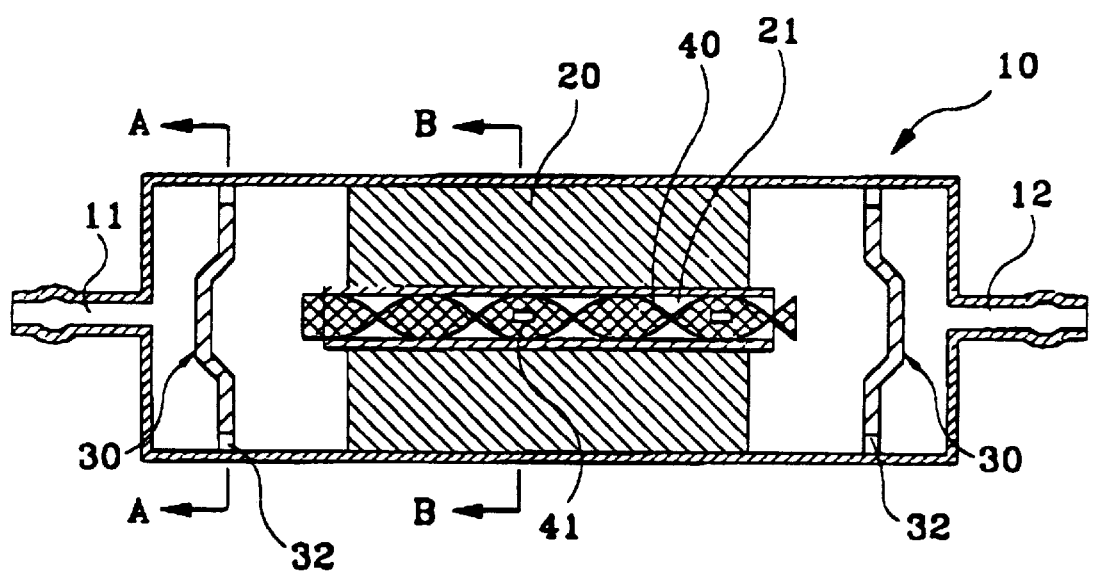
FIG. 2 is a lengthwisely cross-sectional view of a fuel activation apparatus using a magnetic body according to one embodiment of the present invention.
Figure 3A:
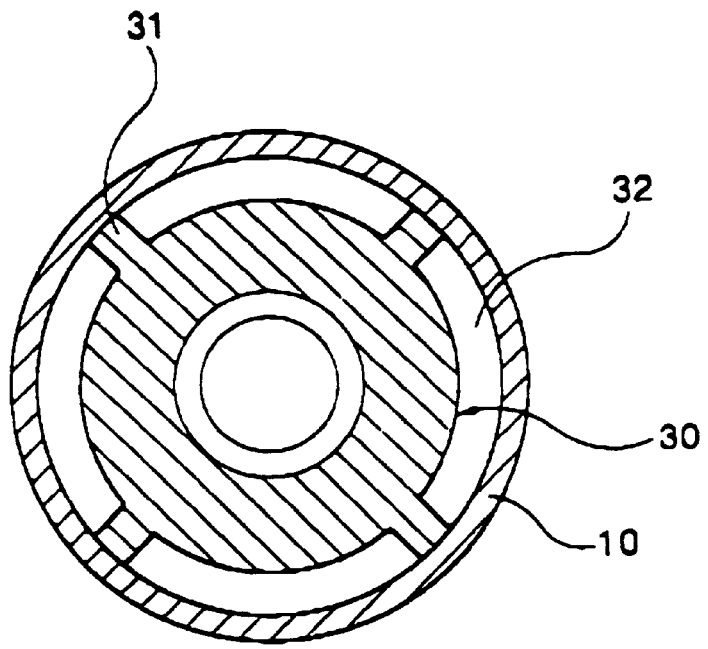
FIG. 3A is a cross-sectional view showing a fuel activation apparatus taken along a line A—A of FIG. 2.
Figure 3B:
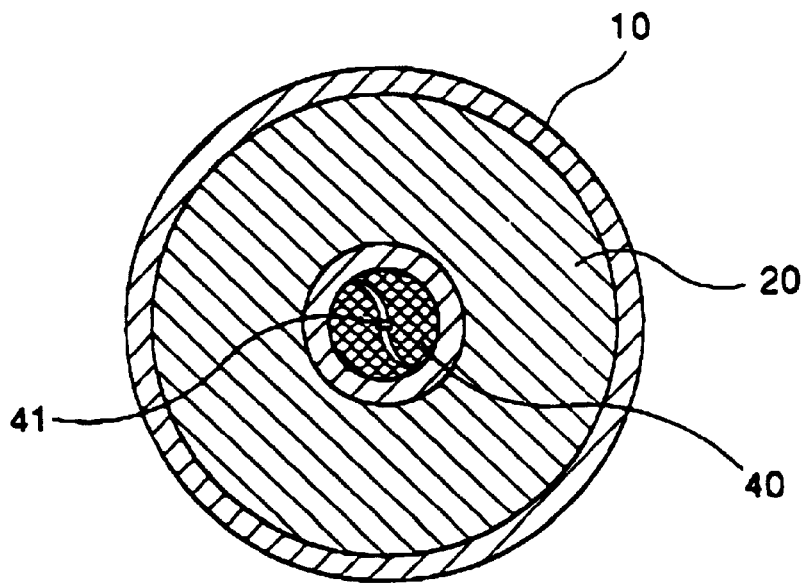
FIG. 3B is a cross-sectional view showing a fuel activation apparatus taken along a line B—B of FIG. 2.

FIG. 1 is a perspective view showing a partly cut-section of a fuel activation apparatus using a magnetic body according to one embodiment of the present invention, FIG. 2 is a lengthwisely cross-sectional view of a fuel activation apparatus using a magnetic body according to one embodiment of the present invention, FIG. 3A is a cross-sectional view showing a fuel activation apparatus taken along a line A—A of FIG. 2, and FIG. 3B is a cross-sectional view showing a fuel activation apparatus taken along a line B—B of FIG. 2.

As shown in the drawings, the activation apparatus of the present invention comprises a hollow cylindrical body 10, at both ends of which an inlet 11 and an outlet 12 are externally protruded, a magnetic body 20 disposed in the cylindrical body 10, and diaphragms 30 which are disposed at both inner sides of the cylindrical body 10, together with the magnetic body 20, and a fuel guide member 40 disposed inside a fuel path of the magnetic body 20.

The body 10 includes a construction in which a fuel guide duct and a cover as disclosed in Korean patent no. 105638 are incorporated. As has been known, the body 10 of a hollow cylindrical shape is integrally incorporated with the inlet and outlet having a small diameter, and is formed with a material such as a resin. That is, the body 10 is in the cylindrical shape forming a predetermined space in which the fuels flow, between the inlet 11 and the outlet 12 thereof.

The magnetic body 20 of the cylindrical shape is fixed at an approximately middle portion of the inside of the body 10, contacting an inner circumferential surface thereof, on the center line of which a fuel path 21 is formed along the center axis of the body 10. The magnetic body 20 is composed of at least one or more shielding members 23 and magnetic force adjustment members 22 centering around the fuel path 21. The magnetic force adjustment members 22 and the shielding members 23 are cylindrically multi-layered and wound with induction coils 24. The shielding structure of a magnetic force is formed at the exterior of the body 10 for shielding the diffusion of the magnetic force into the external. The multi layered magnetic force adjustment members 22 have a main function of inducing or regulating the magnetic force, and also have a function of increasing the magnetic force.

Assuming that a magnet 41 disposed on the center axis of the fuel guide member is a first end, the magnetic force adjustment member 22 becomes a second end. Therefore, the more the magnetic force adjustment members 22 increase in thickness and the number of winding, the more the magnetic force of the second end induced from the first end increases.

The apparatus of the present invention can perform the induction and regulation of the magnetic force. The magnetic force can be adjusted by replacing a part of the magnetic force adjustment member 22 with a magnet or by shielding the magnetic force, and thus the forming range of the magnetic field can be regulated.

The fuel path 21 is disposed on the central line of the magnetic body 20. The fuel guide member 40 having a helical net shape is placed in the fuel path 21, at a predetermined position of which one or more magnets 41 are arranged. The fuel guide member 40 disposed inside the fuel path 21 allows the fuels to quickly rotate and flow, and makes the fuels to be in a state of minute particles by the mounted magnets 41 and the magnetic body 20. Such helical fuel guide member 40 makes the fuels rotatably flow, and simultaneously the magnetic force reaches the whole fuels uniformly.

The diaphragms 30 are respectively disposed near to both sides of the magnetic body 20, and the magnetic force which transmits the diaphragms 30 reaches spaces formed between both inner ends of the body 10 and the diaphragms 30. The diaphragms 30 being made of a semi-magnetic body are provided with a plurality of fixed portions 31 protruded externally towards the circular ends thereof. Also, the diaphragms 30 which are fixed at the inner circumferential surface of the body 10, are provided with a plurality of through holes 32 which allow the fuels to pass through the body 10. As shown in FIG. 3A, the diaphragms 30 fixed in the inside of the body 10 include four fixed portions 31 and four through holes 32 formed between the fixed portions 31 and the inner wall of the body 10.

Accordingly, the fuels inserted into the inner side of the body 10 through the inlet 11, collide with the diaphragm 30 interrupting the direct flow of the fuels, and the collided fuels are moved from a protruded surface of the diaphragm 30 toward the outer circular end thereof, and then pass through the four through holes 32 in a diminished flowing speed. At this time, the speed-reduced flow of the fuels is under the influence of the more magnetic force by the fuel guide member 40 of the fuel path 21

Figure 4:
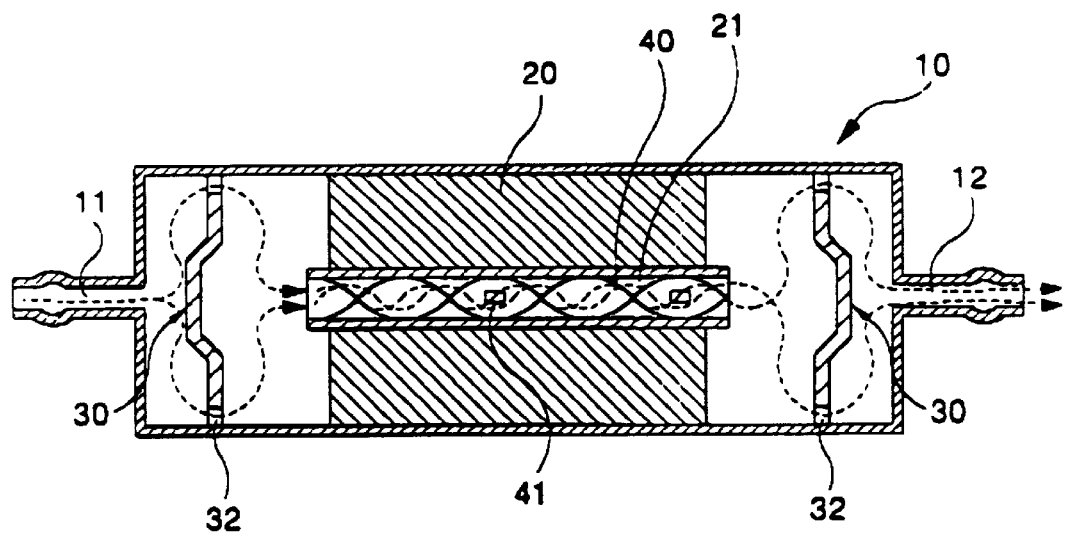
FIG. 4 is a schematic view showing the process of ionization of a fuel activation apparatus using a magnetic body according to the present invention.

FIG. 4 shows the process of ionization of a fuel activation apparatus using a magnetic body according to the present invention. That is, the fuels inserted into the inner side of the body 10 through the inlet 11, collide with the diaphragm 30, flow toward the outer circular end of the diaphragm 30, and then pass through the four through holes 32 in a diminished flowing speed. At this time, the flow of the fuels has predetermined wave motion. The flowing fuels are directed to the fuel path 21 disposed on the center axis of the magnetic body 20, and rotatably flow in a vortex fashion according to the helical fuel guide member 40, thereby maintaining a maximized state decomposed and ionized into the fuel particles. Such activation fuels passed through the fuel path 21 again collide with the diaphragm 30 when emitting, and are directed to the outlet 12 through the through holes 32 of the circumferential end thereof.

Figure 5:
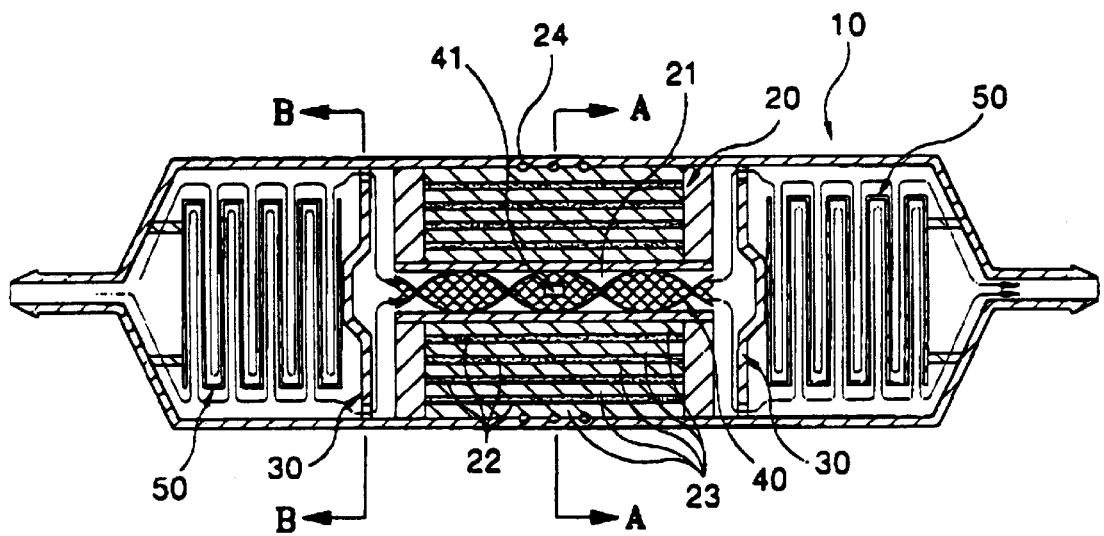
FIG. 5 is a lengthwisely cross-sectional view of a fuel activation apparatus using a magnetic body according to another embodiment of the present invention.
Figure 6A:
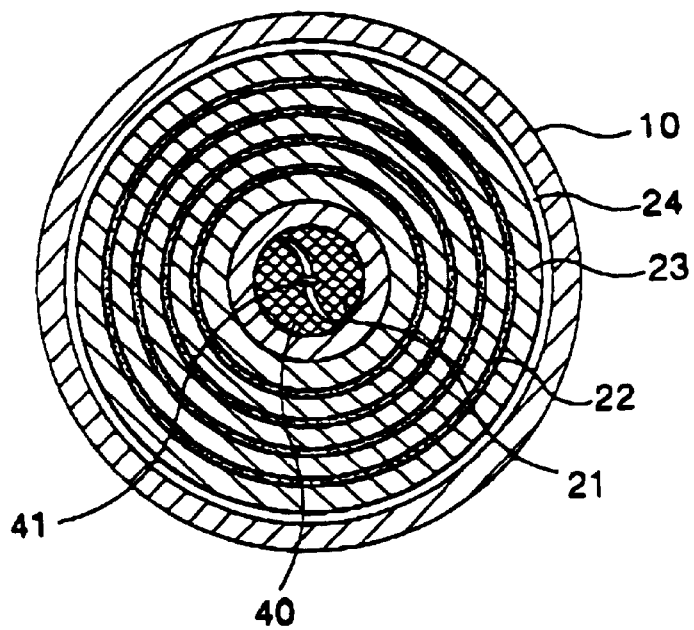
FIG. 6A is a cross-sectional view showing a fuel activation apparatus taken along a line A—A of FIG. 5.
Figure 6B:
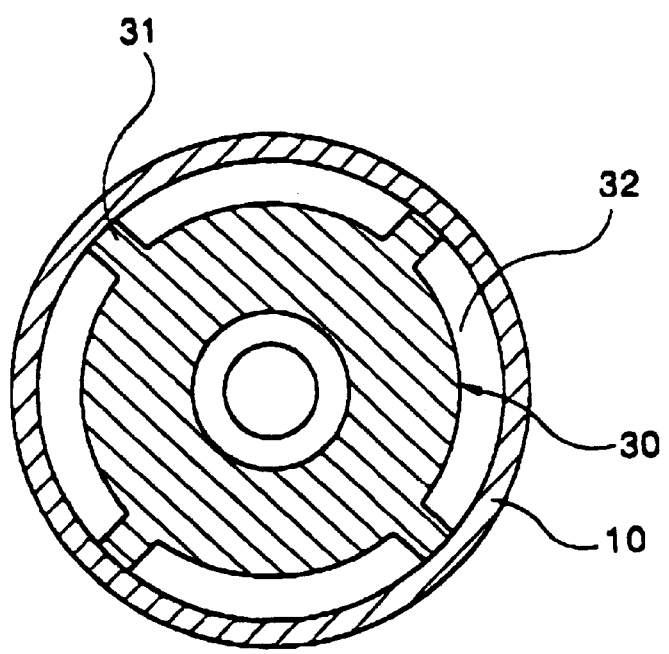
FIG. 6B is a cross-sectional view showing a fuel activation apparatus taken along a line B—B of FIG. 5.

FIG. 5 is a lengthwisely cross-sectional view of a fuel activation apparatus using a magnetic body according to another embodiment of the present invention. FIG. 6A is a cross-sectional view showing a fuel activation apparatus taken along a line A—A of FIG. 5, and FIG. 6B is a cross-sectional view showing a fuel activation apparatus taken alone a line B—B of FIG. 5.

As shown in the drawings, the activation apparatus of the present invention comprises a hollow cylindrical body 10, at both ends of which an inlet 11 and an outlet 12 are provided, and in the inside of which predetermined spaces allowing fuels to flow is formed. The apparatus comprises a magnetic body 20 disposed in an approximately middle portion of the cylindrical body 10, including a fuel path 21, and a pair of diaphragms 30, disposed at spaces formed between front and rear portions of the magnetic body 20 and an inner circumferential surface of the body 10. including fuel through holes 32. At the inside of the fuel path 21 of the magnetic body 20, is disposed a fuel guide member 40 which allows the fuels in a vortex fashion, and at both ends of the magnetic body 20 where the magnetic field is formed, magnetic induction members 50 are disposed.

The diaphragms 30 which are disposed at the front and rear of the magnetic body 20, include a plurality of fixed portions 31 and a plurality of through holes 32 formed between the fixed portions 31 and the inner wall of the body 10. The magnetic body 20 which is fixed in contact with the inside of the body 10, includes the fuel path 21 passing along the center axis of the body 10. More specifically, the magnetic body 20 is composed of magnetic force adjustment members 22 which induce formation of the magnetic field centering around the fuel path 21 and shielding members 23 having a predetermined shielding degree. The magnetic force adjustment members 22 and the shielding members 23 are multi-layered alternately. The magnetic force which is radially diffused centering around the fuel path 21 is finally shielded by the body 10 and increasingly reaches the whole fuel into the front and rear directions of the magnetic body 20. At this time, the remaining leakage flux is induced by the magnetic induction coils 24. The apparatus has an effect that the magnetic force is induced by the magnetic induction member 50, and allows ionization of particles of the fuel to be maximized, thereby maintaining a maximized state decomposed and ionized into the fuel particles.

The magnetic induction members 50 are installed with connection between the diaphragms 30 and the inlet and outlet of the body 10 so that the flowing speed of the fuels is properly regulated and a predetermined induction field is formed in the range that the magnetic force of the magnetic body 20 is emitted laterally. The magnetic induction members 50 allow the ionization of the fuels to be performed uniformly.

Figure 7:
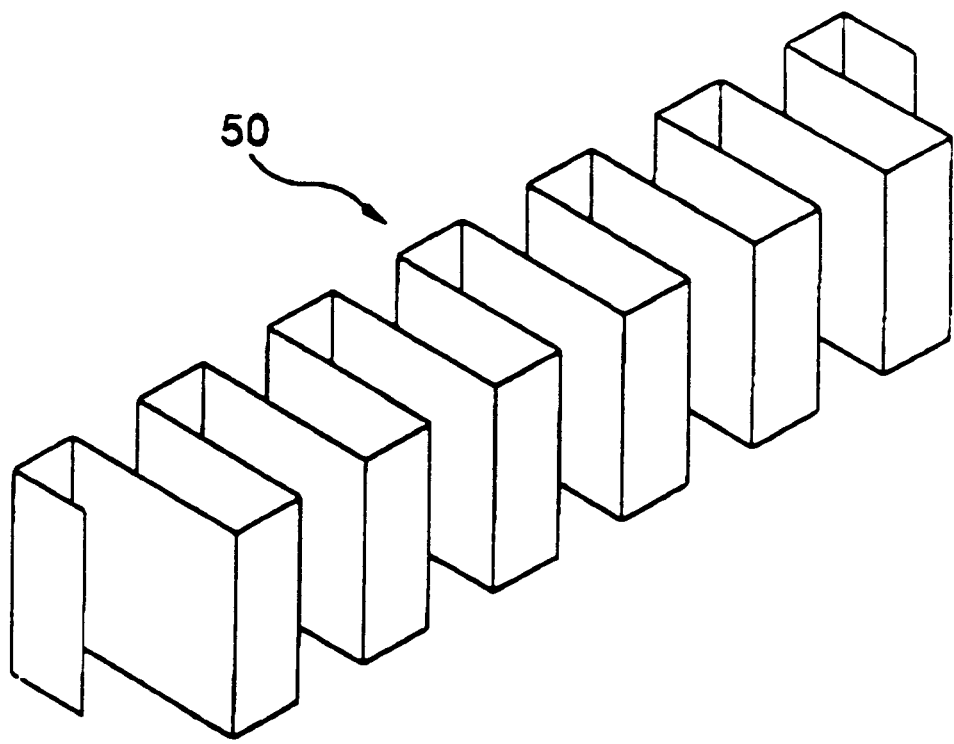
FIG. 7 is a view showing a magnetic induction member in a fuel activation apparatus using a magnetic body according to the present invention.

As shown in FIGS. 5 to 7, the fuel activation apparatus according to another embodiment of the present invention comprises the hollow cylindrical body 10, the magnetic body 20 disposed in the cylindrical body 10, the diaphragms 30 disposed at the front and rear spaces of the magnetic body 20, and the magnetic induction members 50 placed in the outer spaces of the diaphragms 30. The magnetic induction members 50 has a sequently multi-layered structure.

The speed of fuels inserted into the inlet 11 is remarkably decreased by the magnetic induction members 50, but simultaneously first ionization is fully performed, even though the flowing speed is reduced because the fuels pass through the magnetic field formed by the magnetic induction member 50 and flow into the through holes 32 of the diaphragm 30. The first ionized fuels are secondly ionized in the magnetic field of the magnetic body 20 having great strength, and then the second ionized fuels are thirdly ionized in the magnetic field of the magnetic induction member 50 passing through the diaphragms 30. FIG. 7 shows an example of the magnetic induction member 50 in the fuel activation apparatus using the magnetic body.

Two or more magnetic bodies 20 can be adopted in the above embodiments of the present invention. An interval of a plurality of the magnetic bodies and installation space of the magnetic induction members, which are multi-layered, are formed in proportion to the magnetic force of the magnet.

As described above, the fuel activation apparatus of the present invention includes diaphragms respectively disposed in the proximity of an inlet and an outlet of the body, which enable an insertion speed of the fuels to be reduced, and thus the fuels passing through the fuel guide member are decomposed and ionized. Accordingly, the apparatus provides effects that the ionization of the fuels is maximized to obtain uniform minute particles.

Furthermore, the apparatus of the present invention provides an effect that the fuel particles are ionized and decomposed, and minutely split to make an activation state, via ionization processes by the fuel guide member and an inductive magnetic filed during inserting and emitting the fuels. Accordingly, the combustion efficiency can be maximized, thereby providing output increase in vehicles and an effect of saving the fuels and reducing harmful gas emitting.

While only certain embodiments of the invention have been specifically described herein, it will be apparent that numerous modifications may be made thereto without departing from the spirit and scope of the invention.

What is claimed is:

1. A fuel activation apparatus using a magnetic force of a magnetic body, comprising:

a generally hollow body having fuel inlet and outlet ends;

a fuel guide member in said hollow body;

a magnetic body in said hollow body, said magnetic body having opposed ends spaced respectively from the inlet and outlet ends of the hollow body to define spaces in the hollow body adjacent the ends of the magnetic body, said magnetic body having a tubular shape and including magnetic force adjustment members and shielding members centered around the fuel guide member, to induce a predetermined magnetic force, and simultaneously to form a magnetic field toward said spaces in the hollow body; and a pair of diaphragms respectively disposed in said spaces, generally perpendicular to the direction of fuel flow said hollow body having an inner circumferential surface surrounding said spaces, and said diaphragms including predetermined fuel through holes disposed adjacent the inner circumferential surface of the body to reduce the flowing speed of the fuel in the body.

2. The fuel activation apparatus according to claim 1, wherein said diaphragms include portions formed in a predetermined interval along the circumferential ends thereof, and said fuel through holes are disposed in contact with an inner circumferential surface of the hollow body.

3. The fuel activation apparatus according to claim 1 or 2, further comprising magnetic induction members positioned in said spaces between said diaphragms and said inlet and outlet ends of the hollow body, said induction members being sequentially layered in the direction of fuel flow so that the flowing speed of the fuel is regulated and the fuel is decomposed and ionized in the range of the magnetic force of the magnetic body being emitted laterally.

4. The fuel activation apparatus according to claim 3, further including induction coils placed between the outer circumference of the magnetic body and the inner wall of the hollow body.

5. The fuel activation apparatus according to claim 4, wherein the fuel guide member has a helical net shape and enables the fuel to flow in a vortex fashion, at a predetermined position of which one or more magnets is arranged.

6. The fuel activation apparatus according to claim 1, wherein at least two or more magnetic bodies are provided.

* * * * *